US005475809A

United States Patent [19]

Sato

[11] Patent Number: 5,475,809

[45] Date of Patent: * Dec. 12, 1995

[54] METHOD AND APPARATUS FOR GENERATING HIGH-QUALITY CHARACTER PATTERN DEFINED BY EDGE LINES

[75] Inventor: Fumitaka Sato, Oome, Japan

[73] Assignee: Kabushiki Kaisha Toshiba, Kawasaki, Japan

[ * ] Notice: The portion of the term of this patent subsequent to Oct. 1, 2008, has been disclaimed.

[21] Appl. No.: 145,670

[22] Filed: Nov. 4, 1993

Related U.S. Application Data

[63] Continuation of Ser. No. 18,907, Feb. 11, 1993, abandoned, which is a continuation of Ser. No. 899,054, Jun. 16, 1992, abandoned, which is a continuation of Ser. No. 507,521, Apr. 11, 1990, abandoned.

[30] Foreign Application Priority Data

Apr. 12, 1989 [JP] Japan .......................................... 1-92493

[51] Int. Cl.[6] .......................................................... G06T 9/20

[52] U.S. Cl. .......................... 395/151; 395/150; 395/143; 395/139; 395/133

[58] Field of Search .................................... 395/100, 102, 395/110, 133, 139, 141–143, 150, 151; 345/141, 143, 144

[56] References Cited

U.S. PATENT DOCUMENTS

| | | | |
|---|---|---|---|
| 4,298,945 | 11/1981 | Kyte et al. | 364/523 |
| 4,815,009 | 3/1989 | Blatin . | |
| 5,053,759 | 10/1991 | Sato | 395/133 |

FOREIGN PATENT DOCUMENTS

| | | | |
|---|---|---|---|
| 0200885 | 12/1986 | European Pat. Off. | G06F 15/72 |
| 0327002 | 8/1989 | European Pat. Off. | G06F 15/72 |

OTHER PUBLICATIONS

Postscript® Language Reference Manuel, Adobe Sys., Inc. (1985) pp. 69–71.

W. M. Newman & R. F. Sproull, Principles of Interactive Computer Graphics (2d ed. 1979) pp. 20–28.

Microprocessor and Peripheral Handbook, vol. I Microprocessor, Intel the Microcomputer Company.

Chlamtac, M. and Harary, Itzchak, The Shift X Parity Watch Algorithm for Raster Scan Displays, IEEE Transactions on Computers, vol. C–34, No. 7, Jul., 1985, pp. 666–673.

*Primary Examiner*—Almis Jankus

*Attorney, Agent, or Firm*—Finnegan, Henderson, Farabow, Garrett & Dunner

[57] ABSTRACT

An apparatus for generating a high-quality character pattern defined by edge lines includes a code pattern memory, a projection section, a filling section, and a controller. The code pattern memory is divided into a plurality of areas and stores winding number (WN) code data corresponding to a plurality of characters. The projection section, in response to an input projection start command, projects input size-changed edge lines defining a pattern in the code pattern memory in units of N points (N is a positive integer of 2 or more) continuous in a line direction perpendicular to a filling direction while the WN codes of points corresponding to the plurality of characters stored in the divided areas of the code pattern memory are updated by a WN code determined at each point. The projection section also generates a projection end response when projection of the size-changed edge lines is completed. The filling section, responsive to an input filling command, fills an area defined by the size-changed edge lines to obtain a dot pattern in accordance with the WN codes read out from the code pattern memory. The controller outputs the projection start command in response to an input pattern generation instruction and outputs the filling start command to the filling section in response to the projection end response from the projection section.

6 Claims, 11 Drawing Sheets

| | | SEGMENT INCOMING DIRECTION | | | | | | | |
|---|---|---|---|---|---|---|---|---|---|
| | | →• | ↗• | ↑• | •↘ | •← | •↙ | •↓ | ↘• |
| SEGMENT OUTGOING DIRECTION | •→ | - | - | 0 | 0 | ± | ± | - | - |
| | •↗ | - | - | 0 | 0 | 0 | ± | - | - |
| | •↑ | - | - | 0 | 0 | 0 | 0 | - | - |
| | ↖• | ± | ± | + | + | + | + | 0 | ± |
| | ←• | ± | ± | + | + | + | + | 0 | 0 |
| | ↙• | 0 | ± | + | + | + | + | 0 | 0 |
| | •↓ | 0 | 0 | + | + | + | + | 0 | 0 |
| | •↘ | - | - | 0 | ± | ± | ± | - | - |

FIG. 5

| | | WN CODE FROM WNPM | | | | | | | |
|---|---|---|---|---|---|---|---|---|---|
| | | -3 | -2 | -1 | 0 | 1 | 2 | 3 | ± |
| DETERMINED WN CODE | 0 | -3 | -2 | -1 | 0 | 1 | 2 | 3 | ± |
| | + | -2 | -1 | ± | 1 | 2 | 3 | X | 1 |
| | - | X | -3 | -2 | -1 | ± | 1 | 2 | -1 |
| | ± | -3 | -2 | -1 | ± | 1 | 2 | 3 | ± |

FIG. 6

METHOD AND APPARATUS FOR GENERATING HIGH-QUALITY CHARACTER PATTERN DEFINED BY EDGE LINES

This application is a continuation of application Ser. No. 08/018,907, filed Feb. 11, 1993, now abandoned, which is a continuation of application Ser. No. 07/899,054, filed Jun. 16, 1992, now abandoned, which is a continuation of application Ser. No. 07/507,521, filed Apr. 11, 1990, now abandoned.

BACKGROUND OF THE INVENTION

1. Field of the Invention

The present invention relates to a method and apparatus for generating a high-quality pattern in accordance with an edge for defining a pattern such as a character pattern.

2. Description of the Related Art

In general, an edge is drawn and then the inside of an area surrounded by an edge line or edge lines is filled to generate a pattern. The following first to third methods are available to perform filling of an area defined by the edge line or lines.

According to the first method, a point designated within a defined area is continuously shifted to determine whether the shifted point is located inside or outside the defined area. When a given point is determined to be present inside the area, this point is subjected to filling processing. This method is used in graphic processing in a personal computer or the like. The determination operation is performed in units of points, and its processing speed is low. In addition, this method is based on "continuity of the area", back tracking must be generally performed at a branch point during filling.

According to the second method, a bit map memory which stores edge line data is scanned in a predetermined direction (filling direction) to perform filling of points as "1" from, e.g., an odd-numbered "1" point to an even-numbered "1" point (i.e., even-odd filling). The second method does not require back tracking. In the even-odd filling scheme, the number of crossings between an imaginary line and an edge line is counted. When a count represents an odd number, the corresponding point is determined to be present inside the edge line. Otherwise, the point is determined to be present outside the edge line. According to the second method, however, when the number of dots of, e.g., a sharp end of a character pattern in the filling direction is one (this sharp end is defined as a one-dot sharp end), a subsequent dot string from the sharp-end dot is also filled, resulting in inconvenience. In order to overcome this drawback, character pattern design must be performed not to generate a one-dot sharp end (a sharp dot having only one dot in a direction perpendicular to the filling direction is not called a one-dot sharp end), resulting in cumbersome, time-consuming operations. In order to generate a one-dot sharp end, an edge line of a character pattern having a one-dot sharp end must be overwritten after a character pattern having no one-dot sharp end is generated by filling processing.

According to the second method, when edge lines of a character pattern do not overlap each other, as shown in FIG. 1A, a correct character pattern shown in FIG. 1B can be obtained. However, when edge lines of a character pattern overlap on the same lattice line and form a one-dot line width due to pattern reduction or the like, as shown in FIG. 1, a wrong character pattern shown in FIG. 1D is undesirably generated. The filling direction in FIGS. 1B and 1D is a y direction (i.e., downward direction in FIGS. 1B and 1D).

The third method is a filling method in accordance with a non-zero winding number scheme used in the Post Script as a page descriptive language developed by Adobe Systems Inc. As shown in FIG. 2A, when a drawing direction of an edge line is directed to the left with respect to a vector from the infinity, i.e., a vector RV representing a filling direction, a winding number WN is incremented by one. However, when the drawing direction of an edge line is directed toward the right, as shown in FIG. 2B, the winding number is decremented by one. If the resultant winding number is zero, the corresponding crossing is determined to be present outside the edge line. Otherwise, it is determined to be present inside the edge line. According to the third method, segments constituting an edge line of a character must be sorted and listed in accordance with a given standard such as y-coordinates. When a "FILL" command is to be executed, a program loop is generated to scan scanning lines, e.g., lines parallel to the x-axis, downward. All intersections between the scanning lines parallel to the x-axis and the segments in the list must be obtained every loop. The descriptive contents of the segments are checked in an order of x-coordinates of the intersections to determine the drawing directions (upward or downward direction) of the lines, and the winding numbers (to be referred to as WNs hereinafter) are obtained. A line for a non-zero interval of the WNs is drawn in the bit map memory. The above operations are repeated in the program loop according to the third method.

As described above, according to the third method, the list of segments constituting the edge must be checked every line. For this reason, a long processing time is required for a complicated pattern such as a kanji (Chinese character) pattern whose segment list is relatively long. The computation of the above intersections must also be repeated by the "total number of dots of the edge line". As described above, in filling processing based on the conventional even-odd scheme, a line having a one-dot width and a character pattern having a one-dot sharp end cannot be accurately generated. High-speed processing cannot be performed in filling processing based on the non-zero winding number scheme. In either scheme, filling processing is performed in units of dots, and the processing speed is inevitably low.

Filling not in units of points but words in the filling direction may be proposed. Filling in units of words can provide a higher processing speed than filling in units of points. According to this scheme, however, lines must be switched every one-word processing, and filling in units of words is not suitable for continuously processing a large volume of data. In addition, in conventional filling processing, a character pattern is generated by filling of each character, and a blank between adjacent character patterns (i.e., a dot position of the right and left ends of the adjacent character pattern areas) does not often coincide with an end/start portion (i.e., a so-called word boundary) of units of writing of the bit map memory. Filling cannot be performed by simple word processing. Therefore, high-speed processing cannot be performed, and complicated hardware or the like is required. In particular, when a large number of relatively small characters are used as text characters, high-speed processing in units of characters is impossible.

SUMMARY OF THE INVENTION

It is an object of the present invention to provide a method and apparatus capable of correctly generating character patterns having a one-dot line width and a one-dot sharp end and capable of generating a complicated character pattern and a relatively small character pattern at high speed.

According to the first aspect of the present invention, an apparatus for generating a high-quality character pattern defined by edge lines, comprises: code pattern memory means, divided into a plurality of areas, for causing each of said plurality of areas to store winding number (WN) code data corresponding to a plurality of characters; projecting means, in response to an input projection start command, for projecting input size-changed edge lines defining a pattern in said code pattern memory means in units of N (N is a positive integer of not less than 2) points continuous in a line direction perpendicular to a filling direction while the WN codes of points corresponding to the plurality of characters stored in said divided areas of said code pattern memory means are updated by a WN code determined at each point, and for generating a projection end response when projection of the size-changed edge lines is completed; filling means, in response to an input filling command, for filling an area defined by the size-changed edge lines to obtain a dot pattern in accordance with the WN codes read out from said code pattern memory means; and control means for outputting the projection start command in response to an input pattern generation instruction and the filling start command to said filling means in response to the projection end response from said projecting means.

According to the second aspect of the present invention, a method of generating a high-quality character pattern designated by edge lines, comprises the computer steps of: (A) dividing a winding number code pattern memory into a plurality of areas and storing winding number (WN) code data in at least one of the plurality of divided areas, the winding number code data corresponding to a plurality of characters; (B) reading out the WN codes from a divided area except for an area in which the WN code data are written, and for filling an area of a character pattern defined by size-changed edge lines; and (C) simultaneously performing the steps (A) and (B).

According to the present invention, the number of changes in winding numbers and change states of points constituting a final arrangement of all line drawings defining one character pattern can be obtained as WN codes in a winding number code pattern memory (WNPM) 17 upon tracing of each line drawing once. WN data of the respective points can be easily obtained simultaneously in units of N points from the storage contents of the WNPM 17 and a line memory 19, thereby generating a character pattern by filling at high speed.

An operation for obtaining WN data is continuously performed along a line direction in units of N points continuous in the line direction. When scanning of one line is completed, the next line is then scanned. The N value can be matched with a word length of a bit map memory in the line direction. The filling pattern dots determined by the WN data can be transferred to the bit map memory in units of N dots at high speed in accordance with simple addressing.

The winding number code also represents simultaneous occurrence of one increment and one decrement in points immediately preceding and succeeding a target point due to pattern reduction. Filling data is generated in consideration of this state to prevent erroneous filling disappearance of fine lines.

The storage area of the WNPM 17 is divided into a plurality of divided areas ($BS_i$) which are used to cause the filling processing section to perform filling in each divided area where second WN code updating processing using the WN code update table is completed. Updating by the update section and filling by the filling processing section can be simultaneously performed to further increase the operation speed in generation of character patterns. When part of one character pattern exceeds an area which includes its character segment origin, a divided area which includes a portion outside this area is selected by a half adder in the access control circuit in place of an area designated by the first register. The second WN codes can be updated for the correct position, and therefore the WN codes corresponding to one character code and crossing two adjacent divided areas can be efficiently updated.

In the above arrangement, except for processing of an exceptionally large character, WN codes of a plurality of characters are stored in one divided area of the WNPM 17. This divided area is used as a large transfer area, the plurality of characters are subjected to the filling processing in batch, and the processed characters are transferred to the bit map memory.

At the time of transfer of data to the bit map memory, a boundary of the transfer area (divided area) is not determined by a boundary of the character pattern, but can be set to be a position suitable for bit map memory updating and block transfer (a $2^n$ word boundary in this embodiment). Filling and block transfer are performed for character patterns of each character in two steps (a character E in FIG. 12).

A logical filling direction which allows filling in two steps is a direction perpendicular to a main transfer direction (i.e., a line direction, e.g., the horizontal direction in this embodiment).

As a result, both end portions of block transfer (BITBLT) which may require time for processing which cannot be performed by simple processing in units of words are not formed at both ends of all character patterns but at the left end of the leftmost character pattern of the character patterns constituting one line and at the right end of the rightmost character pattern of the character patterns constituting one line. Therefore, transfer of the inner character patterns can be performed by simple write access in units of words.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 5 is a view showing contents of a WN code determination table 15 shown in FIG. 3;

FIG. 6 is a view showing contents of a WN code update table 16 shown in FIG. 3;

DETAILED DESCRIPTION OF THE PREFERRED EMBODIMENTS

Figure 1A:
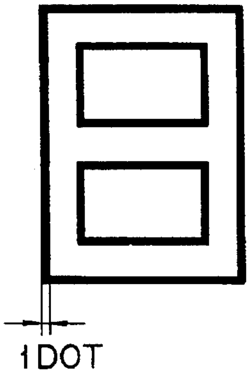
FIG. 1A (PRIOR ART)
FIGS. 1A through 1D are views for explaining patterns generated by conventional methods, respectively.
Figure 1B:
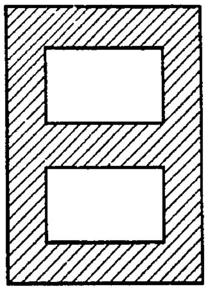
FIG. 1B (PRIOR ART)
Figure 1C:
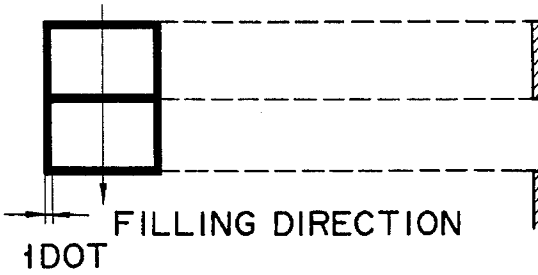
FIG. 1C (PRIOR ART)
Figure 1D:
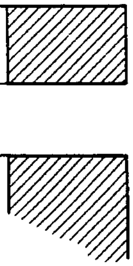
FIG. 1D (PRIOR ART)
Figure 2A:
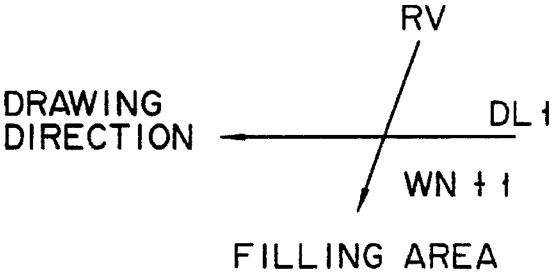
FIG. 2A (PRIOR ART)
FIGS. 2A and 2B are views for explaining winding number (WN) data.
Figure 2B:
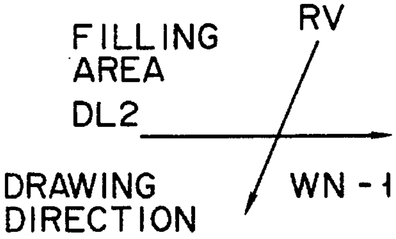
FIG. 2B (PRIOR ART)
Figure 3:
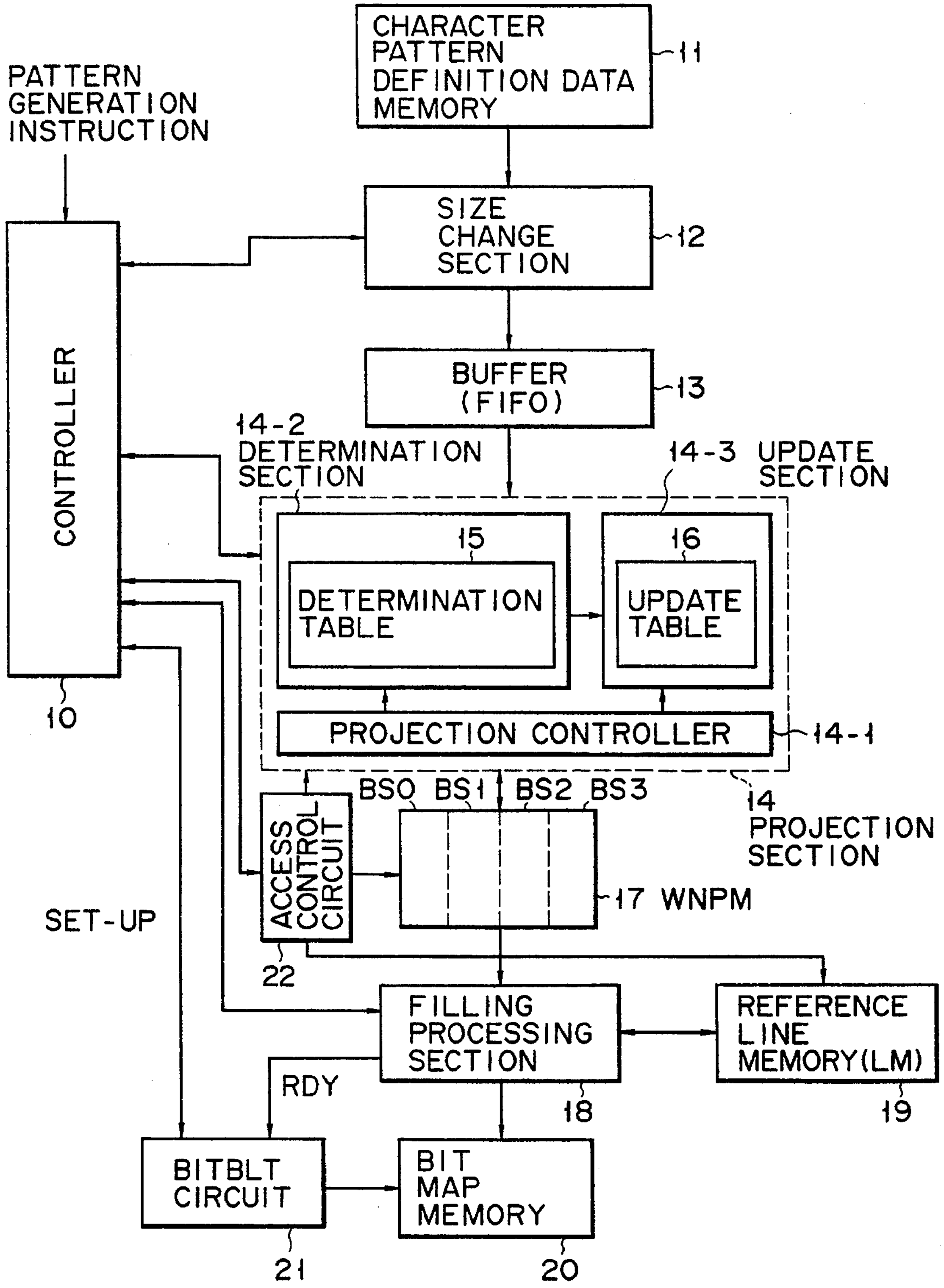
FIG. 3 is a block diagram showing a high-quality pattern generation apparatus according to an embodiment of the present invention.

FIG. 3 is a block diagram showing a high-quality character pattern generation apparatus according to an embodiment of the present invention. Referring to FIG. 3, a character pattern definition data memory 11 stores pattern definition data for defining character patterns having a standard size. Each character pattern consists of at least one pattern, and each pattern consists of at least one partial pattern. Each pattern is defined by an edge line. An edge line consists of a straight line and/or a curve. In this embodiment, an edge defined by an edge line or edge lines is closed. The drawing direction of the edge line is defined as a direction along which a filling area is located on the left side, and the filling direction is defined as the y-axis. In this embodiment, the filling direction is defined as a downward direction, but this definition is not essential to the present invention. For example, the drawing direction may be defined as a direction along which a filling area is located on the right side, and the filling direction may be defined as the x-axis.

The pattern definition data includes data representing the number of patterns constituting a character and the number of partial patterns constituting each pattern, i.e., edge line count data N representing the number of edge lines, and edge line data representing each group of edge lines defining each partial pattern.

A size change section 12 reads out pattern definition data from the memory 11 in accordance with an input size change command and enlarges/reduces pattern definition data read out to obtain a designated size represented by the size change command. The enlarged/ reduced pattern definition data is output to a first-in first-out (FIFO) buffer 13. The FIFO buffer 13 temporarily stores the pattern definition data from the size change section 12.

A projection section 14 projects an edge line determined by edge line data of the pattern definition data from the FIFO 13 onto a WN code pattern memory (WNPM) 17 in units of edge points in response to a projection start command from a controller 10. An edge point is defined as an intersection between an edge line and a lattice line of coordinates projected with this edge line, or a lattice point approximate to this intersection. Each edge point has a winding number (WN) code. When projection processing of one pattern is completed, a projection end response is output to the controller 10. The projection section 14 comprises a projection controller 14-1, a determination section 14-2, and an update section 14-3. The controller 14-1 controls the operations of the determination section 14-2 and the update section 14-3 in accordance with a command from the controller 14-1. The update section 14-3 updates a WN code of a target point which is stored in the WNPM 17 in accordance with a WN code determined by the determination section 14-2.

The determination section 14-2 includes a determination table 15 (FIG. 5) for determining WN codes. The determination table 15 outputs a WN code for a target point on the basis of an edge line segment incoming direction to the target point and an edge line segment outgoing direction from the target point. The determination section 14 determines a WN code 15 for the target point with reference to the determination table 15 on the basis of the edge line data from the FIFO buffer 13 in response to a determination command from the controller 14-1. The WN code is a code representing a difference between the winding number WN of the target point and data WN representing a point opposite to the filling direction with respect to the target point, e.g., an upper point adjacent to the target point in this embodiment.

The WN code and the determination table 15 will be described in detail below.

Eight WN codes are available in this embodiment. The first WN code is code "0" representing that the target point data WN is equal to data of the upper point adjacent to the target point. The second, third, and fourth WN codes are codes "+1", "+2", and "+3" representing that the target point data WN have values larger than the adjacent point data WN by 1, 2, and 3, respectively. The fifth, sixth, and seventh WN codes are codes "−1", "−2", and "−3" representing that the target point data WN have values smaller than the adjacent point data WN by 1, 2, and 3, respectively. The eighth WN code is a code "±" representing that data WN of the upper adjacent point is equal to that of the upper or lower adjacent point in the filling direction but the target data WN represents a value different from each of the data WN of the upper or lower adjacent point data by 1. In character pattern generation processing of this embodiment, a maximum of three edges can overlap each other, so that the eight WN codes, i.e., "−3" to "+3" and "±", must be prepared. Therefore, each WN code is expressed by three bits. When one edge becomes a target edge in the determination table 15, only four WN codes (i.e., "−1" to "+1" and "±") are used in each determination cycle. FIG. 5 shows contents of the WN code determination table 15. Referring to FIG. 5, a black dot "." represents a target point, a direction of arrow "→" toward the black dot represents a segment direction of an edge line from the target point to the present target point, i.e., the segment incoming direction, and a direction of arrow "→" away from the black dot represents a direction from the present target point to the next target point, i.e., the segment outgoing direction. The segment directions are quantized in units of 45° and classified into eight direction codes. The projection section 14 determines a WN code with reference to the determination table 15 (FIG. 5) in accordance with the two direction codes, i.e., the segment incoming direction code and the segment outgoing direction code. The reference for measuring an angle is given by the filling direction, i.e., the y-axis (an angle of 0° is defined in the lower y direction, and an angle is formed counterclockwise).

1) If a segment incoming direction code represents a 90° direction and a segment outgoing direction code represents an angle θ falling within the range of 0°<θ°≦180°, a code 37 –" (–1) is determined as a WN code. If the segment incoming direction code represents the 90° direction and the segment outgoing direction code represents an angle falling within the range of 225°≦θ270°, "±" is determined as a WN code. If the segment incoming direction code represents the 90° direction and the segment outgoing direction code represents an angle falling within the range of 315°≦θ≦360°, "0" is determined as a WN code.

2) If a segment incoming direction code represents a 135° direction and a segment outgoing direction code represents an angle θ falling within the range of 0°<θ180°, "–" (–1) is determined as a WN code. If the segment incoming direction code represents the 135° direction and the segment outgoing direction code represents an angle θ falling within the range of 225°≦θ≦315°, "±" is determined as a WN code. If the segment incoming direction code represents the 135° direction and the segment outgoing direction code represents an angle θ=360°, "0" is determined as a WN code.

3) If a segment incoming direction code represents a 180° direction and a segment outgoing direction code represents an angle θ falling within the range of 0°<θ≦180°, "0" is determined as a WN code. If the segment incoming direction code represents the 180° direction and the segment outgoing direction code represents an angle θ falling within the range of 225°≦θ≦360°, "+" is determined as a WN code. 4) If a segment incoming direction code represents a 225° direction and a segment outgoing direction code represents an angle θ=45°, "±" is determined as a WN code. If the segment incoming direction code represents the 225° direction and the segment outgoing direction code represents an angle θ falling within the range of 90°≦θ≦180°, "0" is determined as a WN code. If the segment incoming direction code represents the 225° direction and the segment outgoing direction code represents an angle θ falling within the range of 225°≦θ≦360°, "+" is determined as a WN code.

5) If a segment incoming direction code represents a 270° direction and a segment outgoing direction code represents an angle θ falling within the range of 45°≦θ≦90°, a code "±" is determined as a WN code. If the segment incoming direction code represents the 270° direction and the segment outgoing direction code represents the angle θ falling within the range of 135°≦θ≦180°, "0" is determined as a WN code. If the segment incoming direction code represents the 270° direction and the segment outgoing direction code represents the angle θ falling within the range of 225°≦θ≦360°, "+" is determined as a WN code.

6) If a segment incoming direction code represents a 315° direction and a segment outgoing direction code represents an angle 8 falling within the range of 45°≦θ≦135°, a code "±" is determined as a WN code. If the segment incoming direction code represents the 315° direction and the segment outgoing direction code represents the angle θ=180°, "0" is determined as a WN code. If the segment incoming direction code represents the 315° direction and the segment outgoing direction code represents the angle θ falling within the range of 225°≦θ≦360°, "+" is determined as a WN code.

7) If a segment incoming direction code represents a 0° direction and a segment outgoing direction code represents an angle θ falling within the range of 0°<θ≦180°, a code "–" is determined as a WN code. If the segment incoming direction code represents the 0° direction and the segment outgoing direction code represents the angle θ falling within the range of 225°≦θ≦360°, "0" is determined as a WN code.

8) If a segment incoming direction code represents a 45° direction and a segment outgoing direction code represents an angle θ falling within the range of 45°≦θ≦180°, a code "–" is determined as a WN code. If the segment incoming direction code represents the 45° direction and the segment outgoing direction code represents the angle θ=225°, "±" is determined as a WN code. If the segment incoming direction code represents the 45° direction and the segment outgoing code represents the angle θ=225°, "±" is determined as a WN code. If the segment incoming direction code represents the 45° direction and the segment outgoing direction code represents the angle θ falling within the range of 270°≦θ≦360°, "0" is determined as a WN code.

Figure 7:
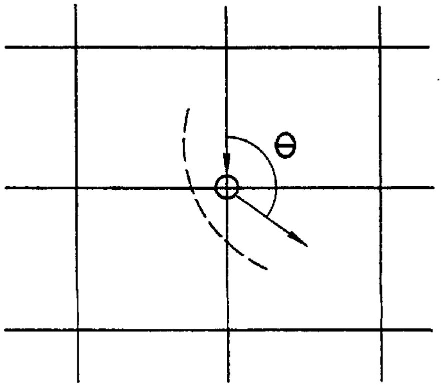
FIG. 7 is a view for explaining an application of a determination rule of the WN codes.

As is apparent from the above description, as show in FIG. 7, when the segment incoming direction code represents a 0° direction and the angle θ represented by the segment outgoing direction code falls within the range of 0<θ≦180°, a lattice point immediately below the target point represented by a hollow circle (o) falls outside the black area of the edge. The target point itself is included in the black area. Therefore, the code "–" is assigned to the target point in accordance with the definition of the WN codes.

When the angle θ represented by the segment outgoing direction code falls within the range of 180°<θ≦360°, the lattice point immediately below the target point falls within the black area, and the lattice point immediately above the target point also falls within the black area, no changes in data WN occur before and after the target point, and the data "0" is generated. It is readily understood that codes in other directions can be easily obtained in consideration of changes in data WN of the target points and the lattice points before and after the target points.

The update section 14-3 includes an update table (FIG. 6). The update section 14-3 outputs an updated WN code with reference to the update table 16 on the basis of the WN code of the target point determined by the determination section 14-2 and the WN code of the target point which is stored in the WNPM 17 in response to an update command from the controller 14-1. The obtained WN code is written at a position corresponding to the target point in the WNPM 17. The WN codes stored in the WNPM 17 can be updated.

FIG. 6 shows contents of the update table 16. The logic of the update table 16 is determined by (updated WN code)=(WN code from WNPM 17)+(determined WN code). The arithmetic rule in this calculation formula is given as follows. If the determined WN code represents a code "+" or "–", the WN code from the WNPM 17 is incremented or decremented by one to obtain an updated WN code. When the updating result represents zero, the code is updated to "±". If the determined code represents a code "±", the WN code from the WNPM 17 is defined as "0" unless it is originally zero. In this case, the WN code from the WNPM 17 is not updated. However, when the WN code from the WNPM 17 represents "0", an operation "0"+"±"→"±" is performed When the determined WN code is "0", the WN code from the WNPM 17 need not be updated. In this embodiment, when the determined WN code is "0", this is signaled to the controller 14-1. At this time, the controller 14-1 does not output an update command to the update section 14-3 so as to achieve high-speed processing. Therefore, the update section 14-3 is kept disabled, the update data 16 is not referred to, or the WNPM 17 is not accessed. For the sake of descriptive convenience, the WN code updated for the generated WN code="0" is shown in FIG. 6. However, this WN code need not be generated in practice. In the update table shown in FIG. 6, a maximum of three edges can overlap each other so that each entry represented by symbol "*" does not exist in this embodiment.

The winding number code pattern memory (WNPM) 17 is a WN code pattern memory (24 bits/word) for storing 3-bit WN codes determined by the projection section 14 in correspondence with points (for approximating the lattice points). The WNPM 17 comprises a high-speed RAM, and its memory area is divided into four areas (to be referred to as buffer segments hereinafter) $BS_0$ to $BS_3$ having the same size. While an WN code is written in one buffer segment $BS_i$, the WN codes written in other buffer segments $BS_j$ (j=0 to 3, provided j≠i) are read out and subjected to filling processing. The WNPM 17 can be accessed twice per machine cycle. In the first half of the machine cycle, access for forming a character pattern edge (WN code write access) is performed. In the second half of the machine cycle, access for performing filling processing (WN code read access) is performed.

The WNPM 17 can perform access twice per machine cycle. In the first half of the machine cycle, access for forming a character pattern edge (WN code write access) is performed. In the second half of the machine cycle, access for performing filling processing (WN code read access) is performed.

The filling processing section 18 is a circuit for performing filling processing on the basis of the WN codes of the respective points stored in the WNPM 17. The WNPM 17 is divided into two WN code storage areas (not shown) capable of storing WN codes of two characters having a maximum size. While the WN codes are written in one storage area, the WN codes are read out from the other storage area and can be subjected to filling processing. The filling processing section 18 has a function of sequentially reading out the WN code every lattice point of the buffer segment $BS_i$ of the WNPM 17 in units of continuous eight points (dots) in the line direction, generating WN numbers of the corresponding eight lattice points on the basis of the WN codes of the eight points and the reference line data (reference W numbers) of the eight points, and performing filling in units of eight points while the line is sequentially changed.

A line memory (to be referred to as an LM hereinafter). 19 comprises a memory (16 bits/word) for storing one-line reference line data (the number of bits of one-point reference line data is 2) of the buffer segment $BS_i$. The bit map memory 20 stores character patterns generated by filling processing by means of the filling processing section 18. A bit block transfer circuit (to be referred to as a BITBLT circuit hereinafter) 21 transfers the character pattern generated by the filling processing section 18 to a designated area of the bit map memory 20 at high speed in accordance with set-up data from the controller 10. The BITBLT circuit 21 performs transfer in response to a one-byte transfer ready signal RDY from the filling processing section 18.

The access control circuit 22 controls access for the WNPM 17. The circuit 22 generates a write address for writing a WN code generated by the projection section 14 in the WNPM 17 and a read address for reading out the WN code and supplying it to the filling processing section 18. Part of the read address supplied from the WNPM 17 to the filling processing section 18 is used as an address for accessing the LM 19.

Figure 4:
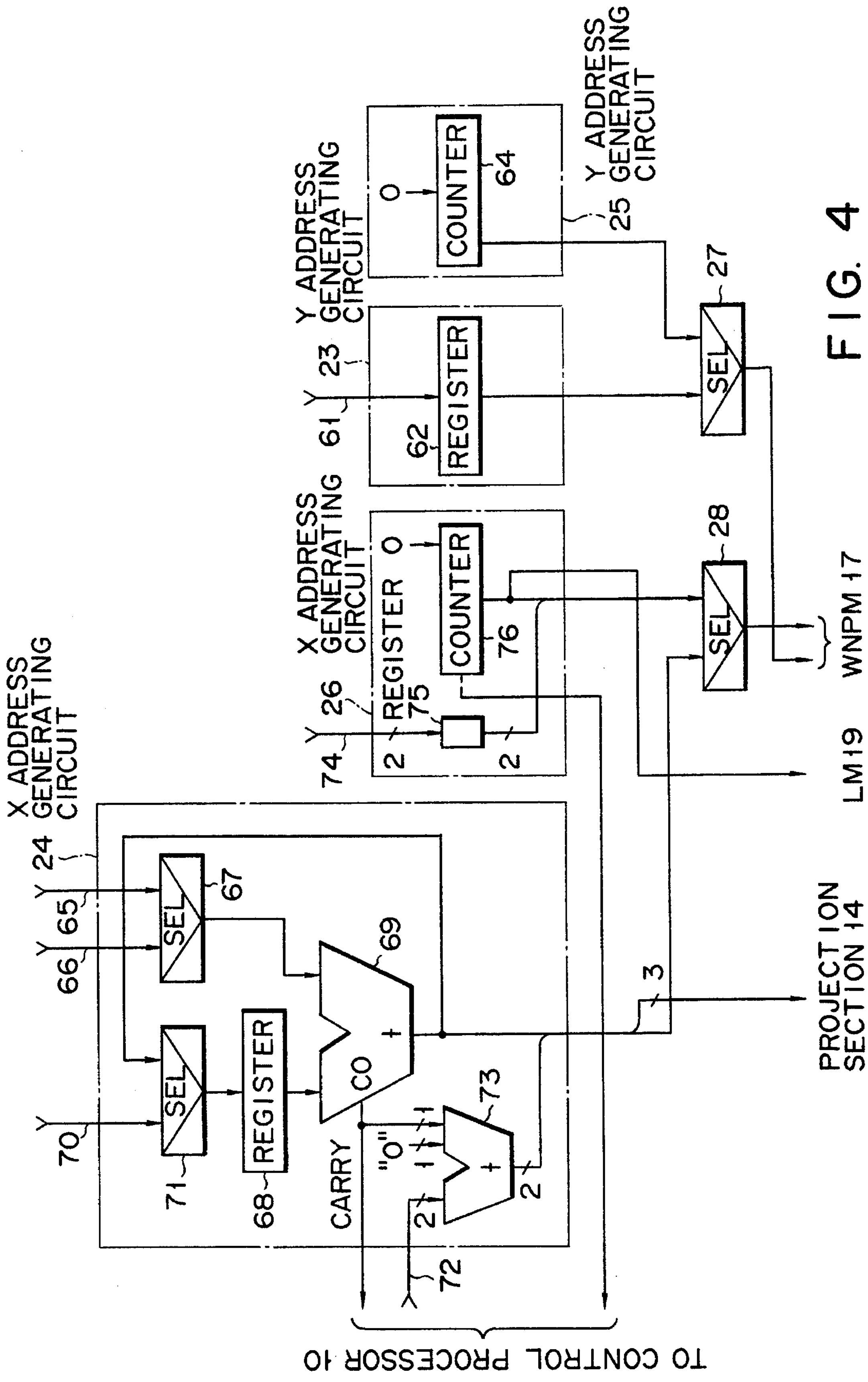
FIG. 4 is a block diagram showing an access control circuit 22 shown in FIG. 3.

FIG. 4 is a block diagram of the access control circuit 22. Referring to FIG. 4, a Y address generating circuit 23 generates a dot address for writing the WN code generated by the projection section 14 in the WNPM 17, and more specifically, an upper address of an address for updating the WN code in the WNPM 17 in response to a read modify write command. In this case, a Y address which represents a line position is generated. An X address generating circuit 24 generates a lower address and, more particularly, an X dot address representing a lattice point position in the line direction. A Y address generating circuit 25 generates an upper address (Y-direction word address) of a word address for reading out the WN codes from the WNPM 18 to the filling processing section 18 in units of eight points (one word). An X address generator 26 generates a lower address (X-direction word address). A selector (SEL) 27 selects one of the Y addresses (Y-direction addresses) in the first and second halves of the machine cycle. A selector (SEL) 28 selects one of the remaining address bits (X-direction word address) except for the lower three bits of the X address (X-direction dot address) from the X address generating circuit 24 and the X address (X-direction word address) from the x address generating circuit 26 in the first and second halves of the machine cycles. Data obtained by linking an output (Y address) from the selector 27 and an output (X address) from the selector 28 represents a word address of the WNPM 17.

The Y address generating circuit 23 comprises a register 62 for storing as a Y address a value supplied from the controller 10 to an input 61. The Y address generating circuit 25 comprises a counter 64 for generating a Y address having a value "0" as an initial value. The X address generating circuit 24 comprises a selector 67 for selecting one of a value (i.e., an X address of a target updating point in the target character segment) of an input 65 supplied from the controller 10 and a value (i.e., a dot size representing an increment of a character origin) of an input 66, a register 68 for storing an X address of the origin (character origin) of the character segment in the buffer segment $BS_i$, and an adder (+) 69 for adding outputs from the register 68 and the selector 67.

The X address generating circuit 24 comprises a selector 71 for selecting one of a value (i.e., remaining address bits except for the upper two bits in the X address of the character origin of the start character of the X-direction character string) of an input 70 supplied from the controller 10 and an output from the adder 69 and for supplying the selected value to the selector 71, and a half adder 73 for adding a carry output from the adder 69 to a value (2-bit buffer segment designation data) of an input 72. Data (an output from the half adder 73 is an upper address part) obtained by linking an output (2 bits) from the half adder 73 and an output from the adder 69 represents an x address (X-direction dot address) of a target updating point in the WNPM 17.

The X address generating circuit 26 comprises a 2-bit register 75 for storing a value (i.e., 2-bit buffer segment designation data for designating the buffer segment $BS_i$ in which a character origin of the start character of the X-direction character string in the filling direction is located) of an input 74 supplied from the controller 10, and a counter 76 for sequentially generating buffer segment $BS_i$ addresses (X-direction word addresses) represented by the register 75 from zero. Data (upper part of the output from the register 75) obtained by linking an output (2 bits) from the register 75 and an output from the counter 76 represents an X address (X-direction word address) of the word (storage area of the 8-point WN codes) to be read out for filling processing from the WNPM 17. An output from the counter 76 represents an address (word address) of the LM 19.

Figure 8:
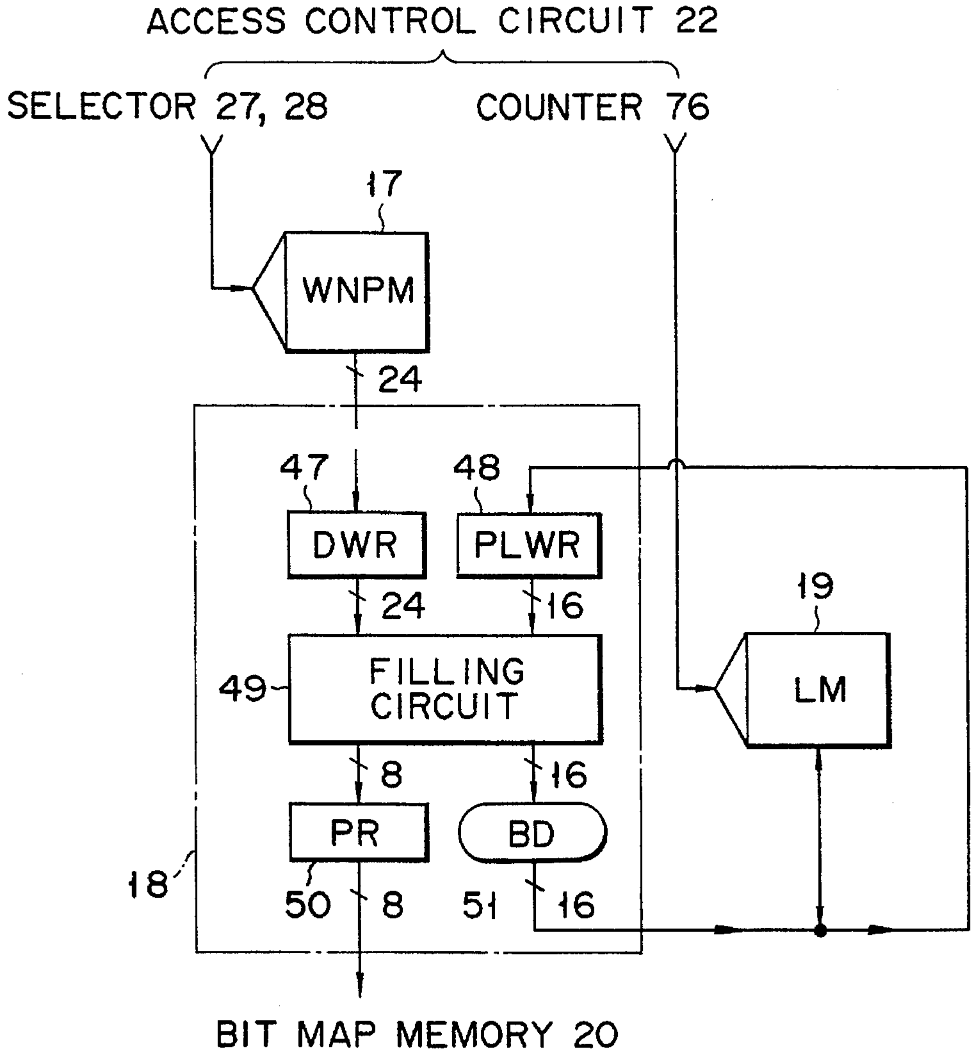
FIG. 8 is a block diagram showing peripheral circuits of a filling processing section 18 shown in FIG. 3.

FIG. 8 is a block diagram showing peripheral circuits of the filling processing section 18. A differential winding-number register (DWR) 47 stores filling word data, i.e., 8-point WN codes (24 bits) read out from the WNPM 17. A previous line winding-number register (to be referred to as a PLWR hereinafter) comprises a 16-bit register for storing word data, i.e., 8-point WN codes (24 bits) read out from the LM 19. A filling circuit 49 has a function of generating and simultaneously outputting 8-point W numbers (16 bits) on the basis of the 8-point WN codes stored in the DWR 47 and the 8-point reference line data stored in the PLWR 48. A pattern register (to be referred to as a PR hereinafter) 50 is an 8-bit register for storing an 8-point filling pattern output from the filling circuit 49 and supplying it to the bit map memory 20. A bus driver 51 causes the controller 10 to output the ready signal RDY (FIG. 3) to the BITBLT circuit 21 when the filling pattern is stored in the PR 50.

Figure 9:
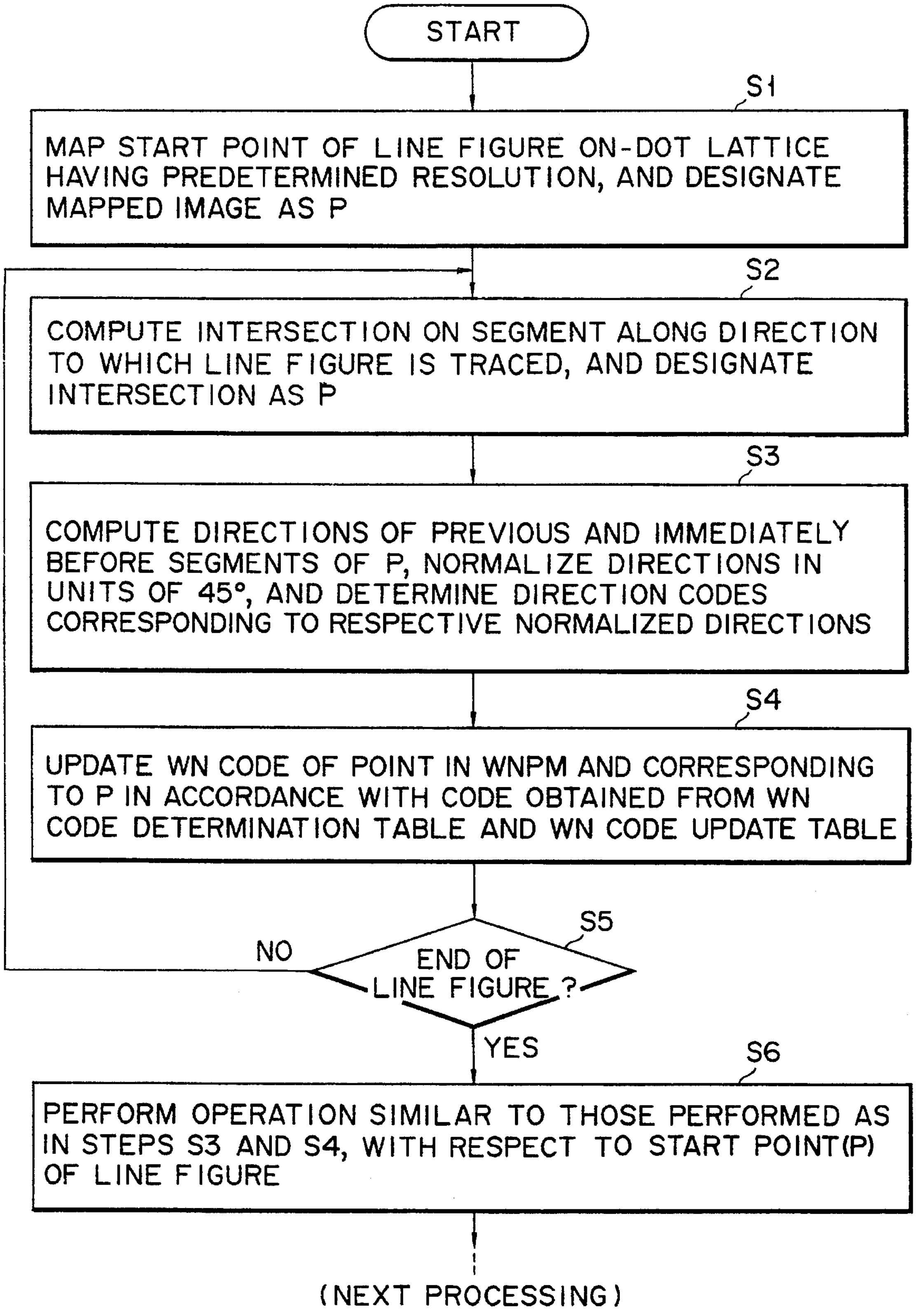
FIG. 9 is a flow chart for explaining an operation of a projection section 14 shown in FIG. 3.
Figure 10:
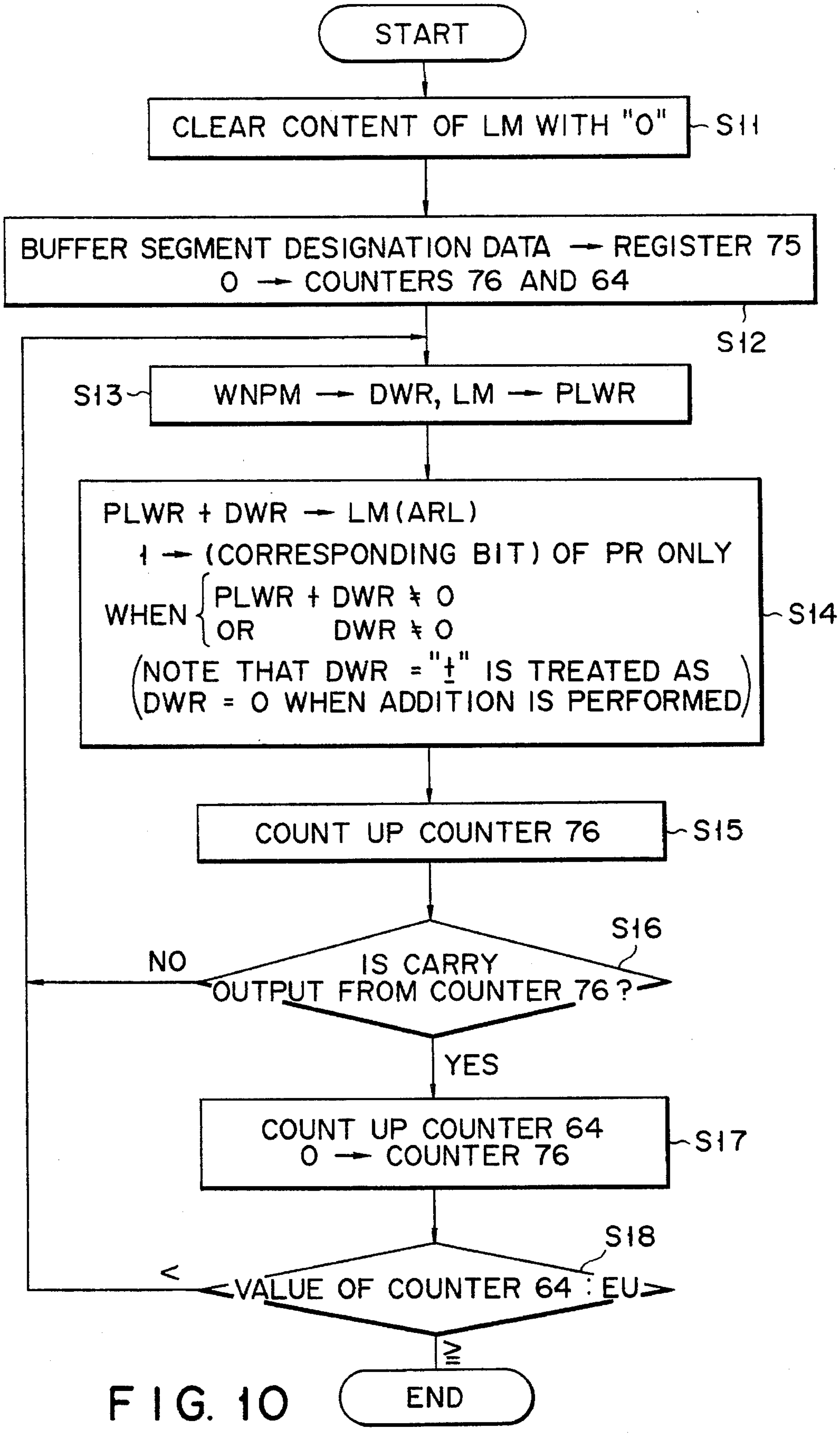
FIG. 10 is a flow chart showing an operation of the filling processing section 18 shown in FIG. 3.

Operations for generating a high-quality pattern, i.e., generation and updating of the WN codes by the projection section 14 will be mainly described with reference to FIGS. 9 and 10.

The size change section 12 in FIG. 3 reads out line drawing information which defines a character pattern of a desired character having a standard size from the character pattern memory and updates such that the readout line drawing information can define the character pattern of the desired character size. The size change section 12 writes the updated line drawing information (the readout line drawing information if no change is made) in the FIFO buffer 13. These operations are also performed in a conventional system.

The projection section 14 sequentially reads out line drawing data from the FIFO buffer 13, projects (plots) the start point of the line drawing on a dot lattice point, as described in step S1, and stores it as a point P. The projection section 14 then computes an intersection (or the next point of a lattice point string for approximating the segment) between the segment and the lattice line in the drawing direction of the line drawing, and designates the computed point as a present target point P.

Figure 13A:
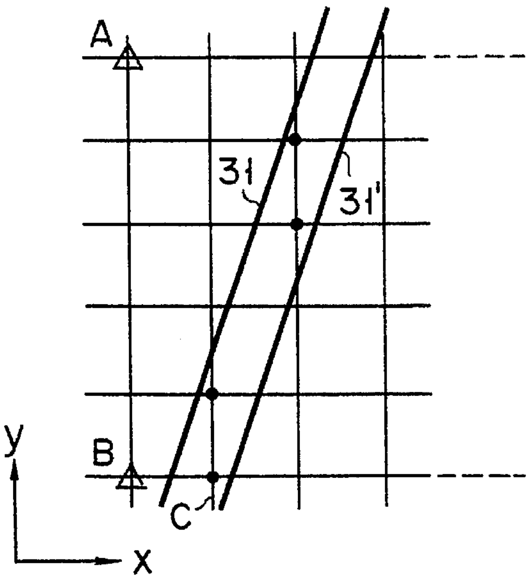
FIGS. 13A and 13B are views for explaining a problem when a pattern having a thin line is reduced.
Figure 13B:
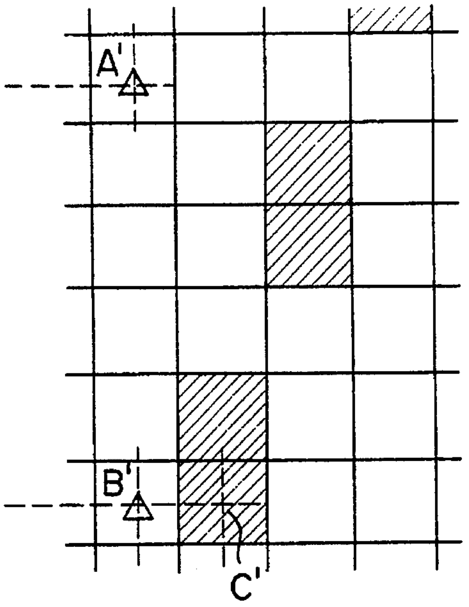

A lattice point for approximating the intersection corresponds to a dot constituting a character pattern to be generated. When a character pattern including a thin line is reduced to a very small size, a partial character pattern representing this thin line passes through the adjacent lattice points, and the partial pattern is cut when only data WN of the projected lattice points are used. In the worst case, when a thin line is parallel to the lattice line, the thin line may perfectly disappear. FIG. 13A shows black diagonal lines 31 and 31' as parts of the character pattern having a line width equal to a reduced lattice point interval and a lattice corresponding to dots to be generated. Referring to FIG. 13A, symbol "●" represents a lattice point (i.e., a lattice point between the lines 31 and 31') of data WN of "1" in an area (black area) between the lines 31 and 31'. Four black dots are shown in FIG. 13A. FIG. 13B shows a dot arrangement of a character pattern to be output, and the center of each dot corresponds to the lattice point in FIG. 13A. For example, lattice points A, B, and C in FIG. 13A respectively correspond to centers A', B', and C' in FIG. 13B. As is apparent from FIGS. 13A and 13B, when a dot corresponding to the W number of "1" (represented by the symbol "●") is colored in black and the black dot is output, a line is interrupted, as shown in FIG. 13B. In the case in FIGS. 13A and 13B, the character pattern line width is equal to an interval between the lattice points. When the character pattern is reduced into a very small size so that its line width is smaller than the interval between the lattice points, the above problem conspicuously occurs.

Figure 14A:
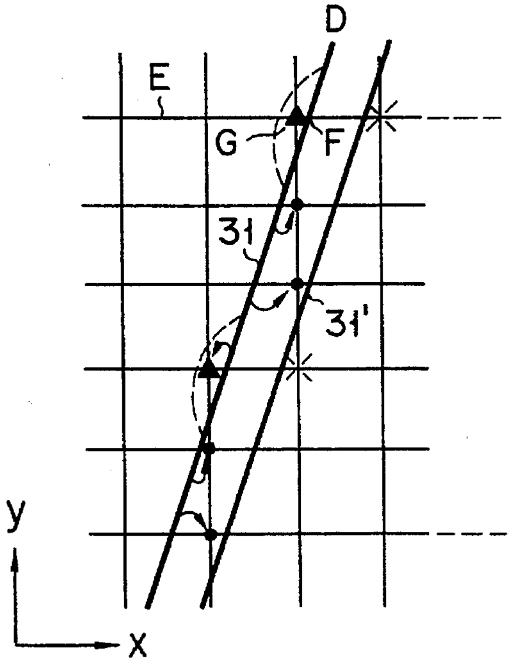
FIGS. 14A and 14B are views for explaining a DDA plot scheme for solving the problem posed by FIGS. 13A and 13B in correspondence with FIGS. 13A and 13B.
Figure 14B:
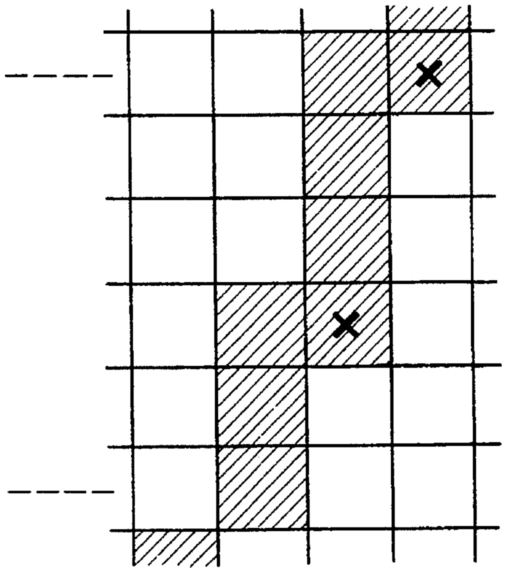

A method of maintaining continuity of the black area, which is applied to the projection section 14 in FIG. 3, will be described with reference to FIGS. 14A, 14B, and 15. FIG. 14A shows part of the same diagonal drawing as that in FIG. 13A (a black portion between the two boundary segments 31 and 31'). This line drawing (of the boundary line 31) is traced from a position indicated by reference symbol D in the lower left direction. In the case shown in FIG. 14A, an angle defined by the line 31 at a position near a position D with respect to a line parallel to the y-axis (in this case, the direction of the line is not taken into consideration, but only the angular range of 0° to 90° is taken into consideration) is larger than an angle with respect to a line parallel to the x-axis. In this case, an intersection F between a lattice point G closest to the point F and a line (lattice line) passing through the next lattice point and parallel to the x-axis is computed. The area is so expanded as to include the point G in the black area (i.e., an area in which the W number is 1).

A technique for plotting points on the lattice points while maintaining 8-point connecting relationship of a line by a known linear drawing algorithm called a DDA (Digital Differential Analyzer) technique, and in particular, a Bresenham algorithm is used to obtain a point included in the expanded area. According to the DDA plotting technique, lattice points (plot targets) for approximating the line 31 as indicated by an arrow "→" and symbol "●" in place of an intersection between the line 31 and the lattice point line parallel to the x-axis are sequentially obtained in the case of FIG. 14A while the 8-point connecting relationship is kept maintained. In the same manner as in the case wherein the resultant points are initially included in the back area, the resultant points are set to belong to the black area even if they are present outside the black area. That is, the black area is expanded, as indicated by dotted curves. The above operations are similarly performed for the line 31' (provided that the tracking direction is an upper right direction), and the plotting target lattice points for approximating the line 31' are sequentially obtained while the 8-point connecting relationship is kept maintained. Lattice points of the boundary line 31 included in the expanded area are represented by triangular marks (▲), and lattice points of the boundary line 31' included in the expanded area are represented by crossing marks (X). When dots corresponding to the points represented by the symbols "●" and "▲" are output as black dots, a pattern is obtained such that dots represented by crossing marks in FIG. 14B are excluded, and the black area is constituted by eight continuous dots, i.e., the 8-point connecting relationship. The result shown in FIG. 14B includes dots (crossing marks in FIG. 14B) included in the expanded area upon processing of the boundary line 31'. In this case, the four adjacent black dots satisfy a 4-point connecting relationship but do not always satisfy this relationship. Even if the line width is reduced, the 8-point connecting relationship of the adjacent black dots can be assured by the known DDA plotting technique.

Figure 15:
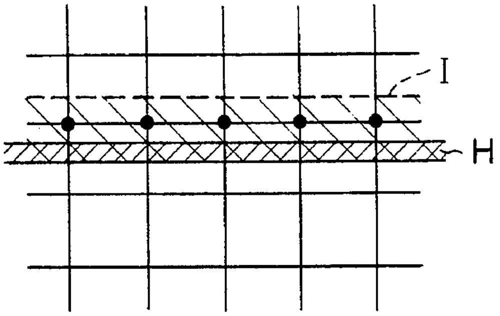
FIG. 15 is a view for explaining an operation when the DDA plot scheme is applied to a reduced horizontal pattern having a thin line.

When a kanji pattern (especially a character pattern of a Ming type) having a small horizontal line width is largely reduced, a black area H representing a horizontal line may fall within a space between the adjacent lattice lines, as shown in FIG. 15. In this case, when data WN of each lattice point is mathematically computed and the dot corresponding to the computed data WN is output, the horizontal line perfectly disappears. The DDA plotting technique is, however, applied to the above case, the black area (i.e., the area in which data WN is 1) is expanded to a position indicated by reference symbol I and including lattice points represented by black dots (●) in FIG. 15 in line drawing for expressing, e.g., an upper boundary of the black area H. Therefore, the thin line in the character pattern will not disappear.

When the operation in step $2 is completed, the projection section 14 computes directions of segments preceding and succeeding the point P, normalizes the segment directions to be directions of units of 45°, and generates direction codes (moving direction codes) corresponding to the normalized directions.

When the operation in step S3 is completed, the projection section 14 advances to step S4. By using the WN code generation table 15 in FIG. 5, the projection section 14 generates a WN code determined by a combination of moving directions of the preceding and succeeding segments of the target point, which are represented by the two direction codes generated in step S3. These two direction codes are a code (previous moving direction code) representing a moving direction of the immediately preceding segment portion of the point P and a code (succeeding moving direction code) representing a moving direction of an immediately succeeding segment portion of the point P.

When the projection section 14 generates the WN code generated by using the WN code determination table 15, the projection section 14 performs WN code updating processing (step S4). An operation for generating a character pattern edge according to line drawing data from a start character (A) of a new character string (e.g., A, B, C . . .) for WN code updating processing will be described in detail below.

In order to form an edge pattern of each character of a new character string, the controller 10 for controlling the apparatus as a whole supplies, to the input 70 of the X-address generating circuit 24 in the access control circuit 22, a lower-bit address corresponding to the number D of dots in the X direction (X-direction size) of the buffer segment ($BS_i$) and selected from the X address (X-direction dot address) of the character origin of the start character in the bit map memory 20. The controller 10 sets the address supplied to the input 70 in the register 68 through the selector 71. The address set in the register 68 represents a remaining address except for the upper two bits of the character origin of the start character (A) in the WNPM 17. That is, the remaining address is an address of the character origin in the buffer segment (e.g., $BS_0$) because the area (two-dimensional area) of the bit map memory 20 is controlled in units of 4D (dots) in the X-direction size of the area (i.e., an area when viewed two-dimensionally) of the WNPM 17 with respect to the X direction. The controller 10 supplies, to the input 72 of the X address generating circuit 24 in the access control circuit 22, two-bit buffer segment designation data ("00" in this case) for designating the buffer segment ($BS_0$ in this case) in the WNPM 17 which corresponds to the character origin of the start character (A).

When the WN code generation of a lattice point (to be expressed as the point P for descriptive convenience) in the character segment for approximating the point on the edge of, e.g., the start character (A) in the above state is performed, the Y address of the character (character segment) of the point P is supplied to the input 61 of the Y address generation circuit 23 in the access control circuit 22 and is set in the register 62. The projection section 14 supplies the X address of the point P in the character (character segment) to the input 65 of the X address generating circuit 24 and supplies it to the right input of the adder 69 through the selector 67. The address (X address of the character origin of the character A in the buffer segment $BS_0$ in this case) set in the register 68 is supplied to the left input of the adder 69.

The adder 69 adds both the inputs to generate an X address of the point P in the buffer segment ($BS_0$). When a carry is not output in the addition by the adder 69, the buffer segment designation data ("00" representing the buffer segment $BS_0$ in this case) supplied to the input 72 is directly output from the half adder 73 and is linked with the output from the adder 69. This linked data represents an X address (X-direction dot address) of the point P in the WNPM 17. The remaining address except for the lower three bits of this address, i.e., the X-direction word address representing the word of 8 points on the same line including the point P in the WNPM 17, is supplied to the selector 28 and is selected by the selector 28 in the first half of the machine cycle. At this time, the Y address of the point P in the WNPM 18, which corresponds to the content of the register 62, is selected by the selector 27.

The Y and X addresses respectively selected by the selectors 27 and 28 are linked, and the linked data is supplied to the WNPM 17 to designate the address positions of the eight points including the point P in the WNPM 17. The corresponding word data (i.e., WN codes of eight points including the point P) is read out from the WNPM 17 and is supplied to the WNG 14. The lower three bits of the X address (X-direction dot address) output from the X address generating circuit 24 is supplied to the WNG 14. The WNG 14 selects the WN code of the dot position (point P) corresponding to the word data read out from the WNPM 17 and refers to the WN code update table 16 (FIG. 6) using the selected WN code and the previously generated WN code. The initial values of the WN codes of all points in the WNPM 17 are set to "0". The projection section 14 updates the WN code in the word data corresponding to the point P into the WN code obtained with reference to the WN code update table 16. The updated word data is supplied to the WNPM 17. The word data supplied to the WNPM 17 is written in the original address of the WNPM 17.

When the operation of the WN code updating (step S4) is performed, the content of the buffer segment ($BS_0$ in this case) in the WNPM 17 is shown as WN codes of the respective points up to the point P on the present segment of the in-processing line drawing. The projection section 14 determines whether WN code updating processing is completed up to the last point of the in-processing line drawing. If this WN code updating processing is not completed, the flow returns to step S2, and the next intersection is obtained as a new P. The operations in steps S3 and S4 are repeated by the projection section 14 for this new point P.

Upon completion of all the operations for one line drawing, when one character pattern is defined by a plurality of line drawings and the previous line drawing remains, the projection section 14 repeats the above processing for the remaining line drawings. When processing of all the line drawings for one character (character pattern) is completed, i.e., when write (update) processing of the WN codes corresponding to the edge patterns of one character is completed, the end of processing is signaled to the controller 10. As a result, the controller 10 performs the following operation at the time of start of similar processing of the next character (i.e., the character B in this case). The controller 10 supplies a dot size (i.e., the dot size between the character origins of the adjacent characters on the same line) representing an increment of the character origin to the input 66 of the X address generating circuit 24 in the access control circuit 22. The controller 10 supplies this dot size to the right input of the adder 69 through the selector 67. The X address of the present character origin (i.e., the character origin of the character A) in the buffer segment ($BS_0$), which is output from the register 8, is supplied to the left input of the adder 69. The adder 69 adds both the inputs to generate an X address of the character origin of the next character (B) in the buffer segment ($BS_0$). The address of this new character origin is set in the register 68 through the selector 71.

Figure 11A:
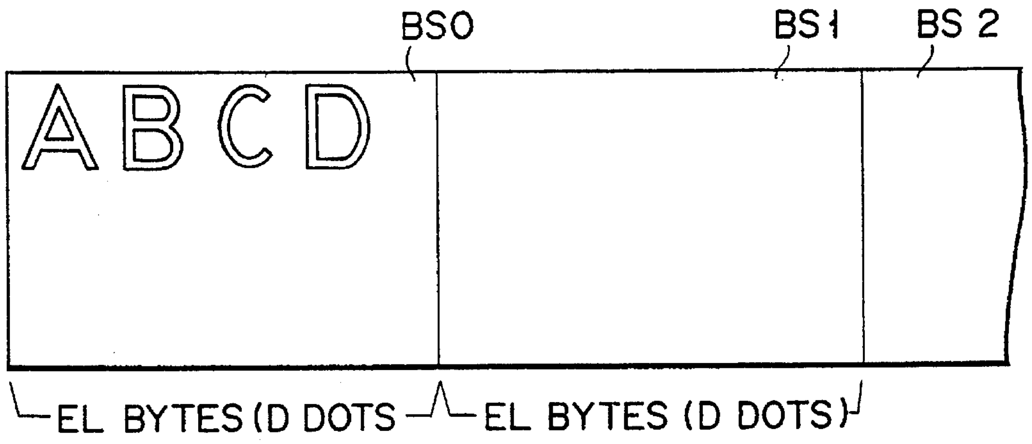
FIGS. 11A through 11D are flow charts showing updating of WN codes.

When the address of the new character origin is set in the register 68, the projection section 14 performs the same operation as the character A for the next character B. The WN codes corresponding to the edge patterns of the character B are written. In this manner, the WN codes corresponding to the edge patterns of the character B next to the character A are written. WN codes corresponding to the edge patterns of the characters C and D are sequentially written while the position of the character origin is shifted in an increment direction (right direction in this case). This state is shown in FIG. 11A.

Figure 11B:
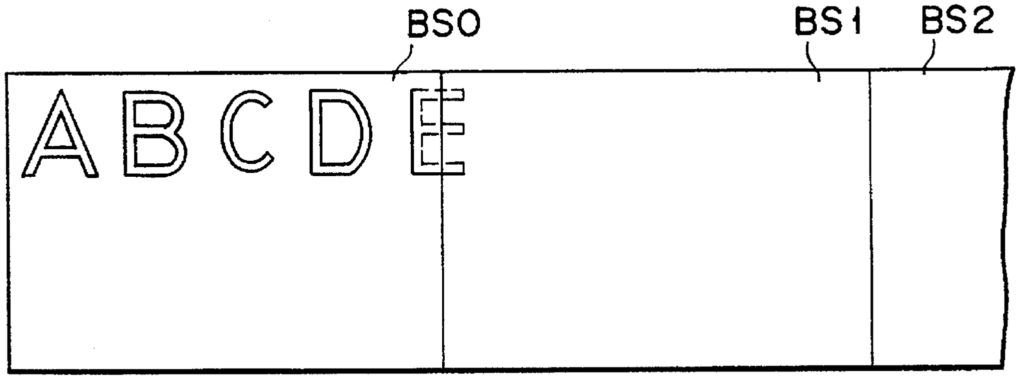

The WN codes corresponding to the edge patterns of the character E next to the character D is started. Assume that the target write point (P) of the character E exceeds a buffer segment boundary (i.e., a boundary between the buffer segments $BS_0$ and $BS_1$), as shown in FIG. 11B. This phenomenon occurs when the character origin in the buffer segment ($BS_0$) comes close to the next buffer segment ($BS_0$) side and the X address of the target write point (P) in the character segment of the character E is incremented. In this case, a carry signal is output from the adder 69. A broken line part of the character E in FIG. 11B represents an edge prior to WN code writing (updating).

The carry output from the adder 69 is supplied to the right input of the half adder 73. A value "01" obtained by adding "01" to data "00" representing the buffer segment $BS_0$ and supplied to the left input of the half adder 73 through the input 72 is output from the half adder 73. The WN codes are written in the buffer segment $BS_1$ next to the buffer segment $BS_0$ currently controlled by the controller 10. In the write processing of the WN codes corresponding to the edge patterns of the character E, when the point (p) shifted to the buffer segment $BS_1$ next to the buffer segment $BS_0$ returns to the buffer segment $BS_0$, the carry is not output from the adder 69, and the output from the half adder 73 becomes "00", thereby writing the WN codes in the buffer segment $BS_0$. According to this embodiment, the WN code corresponding to the edge pattern of the character (E) extending across the buffer segments $BS_0$ and $BS_1$ in which the character origin is present can be efficiently written. This also applies to a case wherein the character origin is present in another buffer segment.

When a carry is output from the adder 69 while the character origin is present in the buffer segment $BS_3$, an output from the half adder 73 becomes "00", and the WN code is written across the buffer segments $BS_3$ and $BS_0$.

Figure 11C:
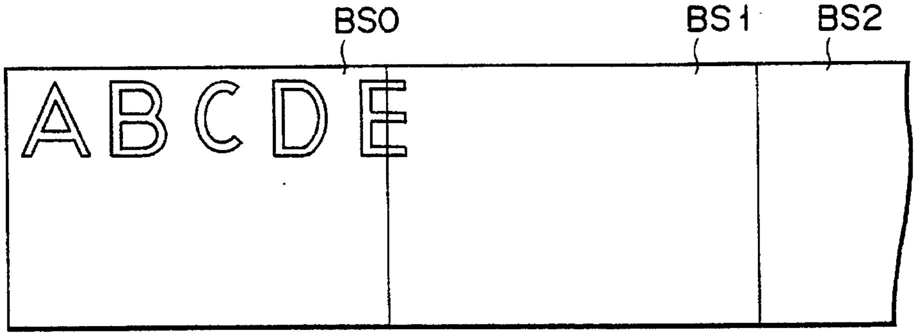

When write access of the WN codes corresponding to the edge patterns of the character E is completed, as shown in FIG. 11C, the controller 10 starts the same processing as described above for the next character (the character F in this case). More specifically, the controller 10 supplies a dot size representing an increment of the character origin to the input 66 of the X address generating circuit 24 in the access control circuit 22. This dot size is supplied to the right input of the adder 69 through the selector 67. The adder 69 adds the dot size of its right input to the X address (supplied to its left input) of the character origin of the character E in the buffer segment ($BS_0$). In this case, a carry and an X address (character origin address) of the character origin of the next character F in the buffer segment ($BS_1$ in this case) are output from the adder 69. The address of the origin of the new character is set in the register 68 through the selector 71.

Upon supply of the dot size representing the increment of the character origin to the input 66 (at the start time of WN code processing for the next character), when the carry is output from the adder 69, the controller 10 determines that the WN code updating in the buffer segment ($BS_0$) represented by the input buffer segment designation data ("00") is completed. In this case, data "01" for designating the next buffer segment $BS_0$ is supplied from the controller 10 to the input 72 to cause the projection section 14 to perform WN code updating of a character string next to the next character (F) in the buffer segment $BS_0$. At the same time, the controller 10 causes the filling processing section 18 to perform filling using the updated WN codes written in the buffer segment $BS_0$. This filling processing will be described with reference to a flow chart in FIG. 10.

The controller 10 clears the content of the LM 19 to zero in step S11. In step S12, the controller 10 supplies the buffer segment designation data "00" for designating the buffer segment $BS_0$ to the register 75 in the X address generating circuit 26 through the input 74. At the same time, an initial value "0" is set in the counter 76 in the X address generating circuit 26. In step S12, the controller 10 sets an initial value "0" in the counter 64. An output (buffer segment designation data) from the register 75 and an output (word address of the buffer segment in the X direction) from the counter 76 are linked, and the linked data is supplied to the selector 28. The linked data of the outputs from the register 75 and the counter 76 represents the X address (X-direction word address) of the word data consisting of the eight filling WN codes in the WNPM 17. In the second half of the machine cycle, the linked data is selected by the selector 28. In this case, the Y address of the word in the WNPM 17 which is an output from the counter 64 is selected by the selector 27.

The Y and X addresses selected by the selectors 27 and 28 are linked and the linked data is supplied to the WNPM 17 to designate the address position (i.e., the start word position of the start line in the buffer segment $BS_0$ in this case) of the 8-point word data in the WNPM 17. The continuous 8-point WN codes (24 bits) in the line direction are read out from the designated word position from the WNPM 17, and the readout data is latched by the DWR 47. In step S13, an output (word address of the buffer segment in the X direction) from the counter 76 is also used to designate the word position of the LM 19. In step S13, the 8-point reference line data (16 bits) continuous from the designated word position of the LM 19 in the line direction is read out and latched by the PLWR 48.

The latched contents (8-point WN codes and reference line data) from the DWR 47 and the PLWR 48 are supplied to the filling circuit 49. In step S14, the circuit 49 simultaneously adds (binary computation) the contents latched by the DWR 47 and PLWR 48 in units of eight points, as indicated by the "DWR+PLWR" in step S14. The content of each point latched by the DWR 47 is one of the codes "–3" to "+3", and "±". However, the WN code "±" is dealt as "0" in the above additions. The sum represented by the "DWR+PLWR" represents the W number of this point. The W numbers (16 bits) of the eight points generated by the circuit 49 are output to the LM 19 through the bus driver 51 as new reference line data referred to when the corresponding point (the same x-coordinate point) of the next scanning line (represented by the content "+1" of the UAR 41) is subjected to filling processing. The generated line data is written at the original word position of the LM 19 which is designated by an output from the counter 76. The LM 19 comprises a high-speed RAM having a capacity corresponding to the number of dots/line or more of the character pattern. When the present invention is applied to a system capable of printing characters having a maximum size of 2" at a maximum resolution of 600 DPI (dots/inch), the number of dots of the character pattern in the horizontal direction is at least 1,200. The LM 19 which can provide this capacity can be realized by a commercially available high-speed static one-chip SRAM (static RAM). It is also possible to arrange the LM 19 together with the filling processing section 18 into an LSI.

The filling circuit 49 checks the sum represented by the "DWR+PLWR" or the latched content of each point in the DWR 47 and generates filling bit data for a point when at least one of the sum and the latched content of the point is not set to be "0". A point whose sum and the content are both zeros is output as filling bit data of "0" (white display). In this embodiment, of all the contents of the eight points latched by the DWR 47, a point not corresponding to the WN code of "0" is generated as the filling bit data of logic "1" for black display even if a point not corresponding to the WN code of logic "0" represents a code "±". Therefore, a dot output at a position corresponding to the edge line is always set to be logic "1", and even a thin pattern can be clearly expressed without any omissions. When the W number (reference line data) at a point of the same x-coordinate position on the line preceding the target filling point is set to be "0" and the WN code of the corresponding point is "±", the filling bit data of logic "1" is generated even for the W number "0". Therefore, a thin pattern reduced to a size smaller than one dot interval can be expressed without omitting the black line.

When the operation in step S14 is completed, the controller 10 counts up the counter 76 in step S15 and determines in step S16 whether a carry is output from the counter 76. If NO in step S16, the operation in step S13 is repeated. However, if YES in step S16, the controller 10 counts up the counter 64 in step S18 and compares the line (Y address in the BNPM 17) with the dots required for compensating for the height of the character to be generated, e.g., a dot count EU corresponding to the height of the character segment of the character to be generated. If the value of the counter 64 is smaller than the value EU, the operation in step S13 is repeated. However, if the count of the counter 64 exceeds the value EU, filling processing for the character written in one buffer segment ($BS_0$ in this case) is completed. If WN code updating for the next buffer segment $BS_1$ is completed, filling processing is performed for the segment $BS_1$ as in the buffer segment $BS_0$. In the above filling processing, as for a character (E in this case) crossing between the buffer segments $BS_0$ and $BS_1$, a portion stored in only the buffer segment $BS_0$ is subjected to filling processing. When the buffer segment $BS_1$ is subjected to filling processing, data "01" is set in the register 75.

Figure 12:
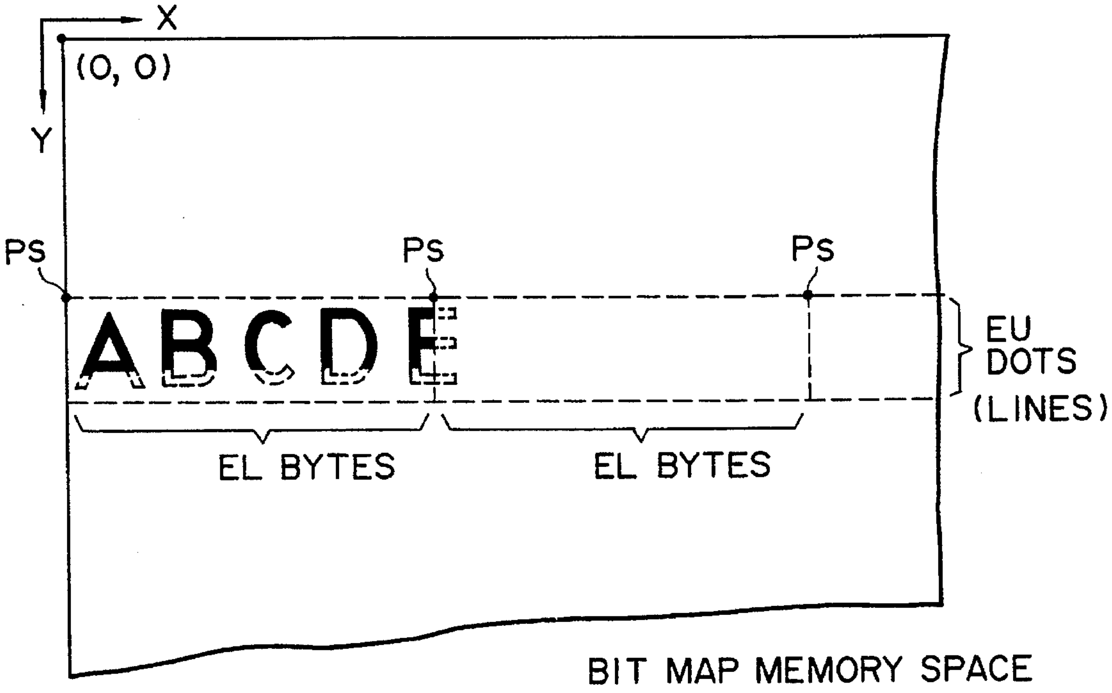
FIG. 12 is a view showing filling processing by the filling processing section 18.

The 8-point filling data (8 bits) output from the filling circuit 49 is transferred to the bit map memory 20 through the PR 50. At this time, the ready signal RDY representing current data transfer (data can be written in the bit map memory 20) is output from the filling processing section 18 to the BITBLT circuit 21. Parameters (set-up data) necessary for continuously writing filling patterns generated in units of eight points by the filling processing section 18 are supplied from the controller 10 to the BITBLT circuit 21 at the start of filling processing. The filling patterns represent the coordinate of a write start position $P_s$ in the bit map memory 20 which corresponds to the buffer segment (in the WNPM 17) from which WN codes are read out for filling by the filling processing circuit 18, as shown in FIG. 12. The filling patterns also represent an X-direction pitch (EL byte=D/8) corresponding to an X-direction word count of the buffer segment ($BS_0$ in this case) and a Y-direction pitch (EU dots).

The BITBLT circuit 21 sequentially writes 8-point filling patterns output from the filling processing section 18 in the same procedures as in the operation for causing the filling processing section 18 to read out the WN codes from the buffer segment in the WNPM 17 while the X address is incremented one by one in the line direction in response to the ready signal RDY. When the EL byte write operation (i.e., write operations by EL times in the line direction) is completed, the BITBLT circuit 21 increments the Y address by one. At the same time, the X address is returned to the same value as that at the start time of write operation. The BITBLT circuit 21 then repeats the write operation of the filling patterns in the line direction again in units of eight points.

Figure 11D:
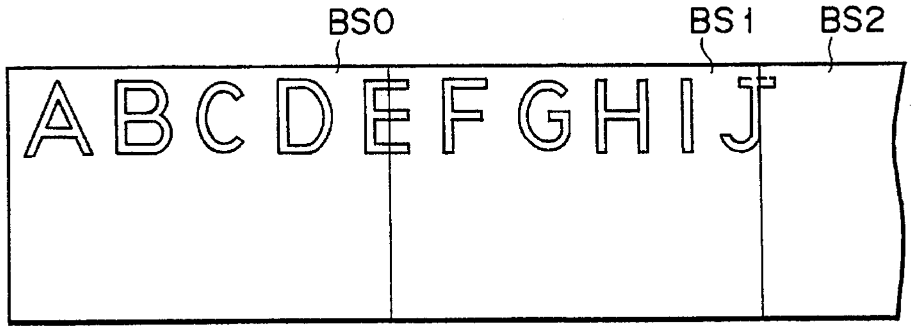

Simultaneous with the write operation of filling patterns (character patterns of the characters A to E in this case) written in the bit map memory 20 on the basis of the WN codes stored in the buffer segment $BS_0$, WN code updating processing of the subsequent character string (F to J) in the buffer segment $BS_1$ is performed as in the buffer segment $BS_0$. This state is shown in FIG. 11D. More specifically, FIG. 11D shows a state of the WNPM 17 at the same timing as in FIG. 12. Referring to FIG. 11D, a broken portion of the character J represents an edge in which the WN codes are not yet written (updated). The filled portion is a black portion shown in FIG. 12.

In the WN code updating processing for the buffer segment $BS_1$, data "01" is supplied to the input 72 when WN code updating processing for the buffer segment $BS_1$ is completed, the data supplied to the input 72 is sequentially updated in an order of "10" and "11" for the buffer segments $BS_2$ and $BS_3$. Thereafter, WN code updating processing for the buffer segment $BS_0$ is performed since the data supplied to the input 72 becomes "00" again. According to this embodiment, WN code updating processing for a character string of one line is performed. The WN code updating processing for the character string of one line according to this embodiment is performed by sequentially switching the four buffer segments $BS_0$ to $BS_3$ in the WNPM 17. This can also apply to filling processing. When processing of one line is completed, the same processing as described above is performed for the next line.

In the filling processing scheme described above, since the set-up data supplied to the BITBLT circuit 21 and required for writing the filling patterns corresponding to one buffer segment can be set by one operation, high-speed transfer to the bit map memory 20 by utilizing the BITBLT circuit 21 can be performed. To the contrary, in the scheme in which filling patterns are written in the filling direction (Y direction), every time a filling pattern having a one-byte width corresponding to EU-line component is performed, new set-up data must be set to write the next EU-line filling pattern having a one-byte width. When the value of the EL is large (e.g., when the present invention is applied to a system capable of printing a character having a maximum size of 2" at a maximum resolution of 600 DPI, 150 or more is required), high-speed transfer is very difficult.

Figure 16:
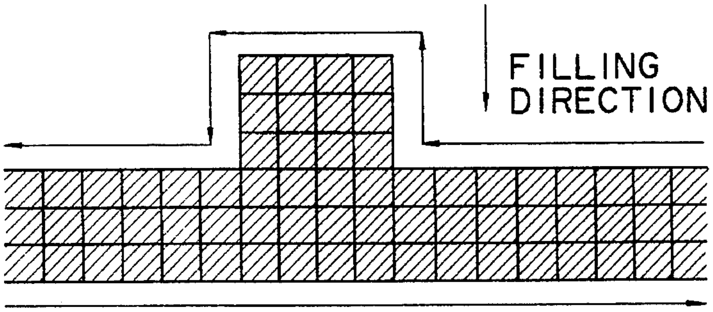
FIG. 16 is a view showing a relationship between a character pattern and a WN code.
Figure 17A:
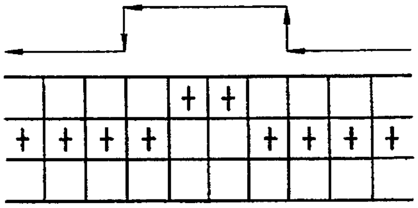
FIGS. 17A and 17B are views showing states in changes in WN code when a character pattern shown in FIG. 16 is reduced into ⅓.
Figure 17B:
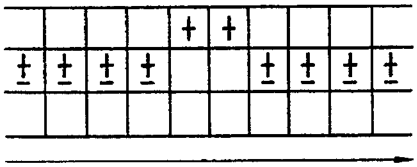

An operation for generating a character pattern having a ⅓ size of the character pattern (part) shown in FIG. 16 by filing by means of the filling processing section 18 will be described below. In this case, when WN codes for the upper edge lines are generated first, the states of the WN codes of the respective points in the WNPM 17 are shown in FIG. 17A. When the WN codes in the WNPM 17 are then updated upon generation of the WN codes for the lower edge lines, the upper and lower edge lines overlap on the same dot due to size reduction. Therefore, the final states of the WN codes of the respective points in the ⅓ reduced pattern of the character pattern shown in FIG. 16 are shown in FIG. 17B. On the basis of the state shown in FIG. 17B, the filling is performed to correctly generate a line having a one-dot width (i.e., a line on which codes "±" are written in FIG. 17B).

Figure 18:
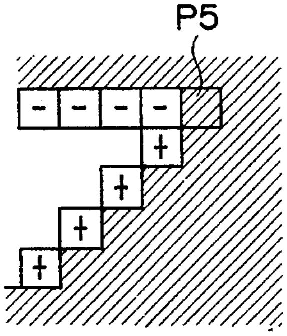
FIG. 18 is a view showing a pattern from which WN code updating can be omitted.
Figure 19:
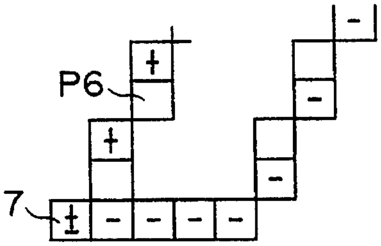
FIG. 19 is a view showing a relationship between a WN code and a pattern having a one-dot sharp end.

In this embodiment, as shown in FIG. 18, points which become black points and are selected from the upper and lower adjacent dots as in points $P_5$ and $P_6$ which are not written with the WN codes are not subjected to updating of the WN codes, as is apparent from the operation of the projection section 14. Unnecessary access of the WNPM 17 is not performed. In addition, in a pattern having a one-dot sharp end, its point $P_7$ has the WN code "±", as shown in FIG. 19. Therefore, correct filling can be performed as in FIGS. 17A and 17B.

In the above embodiment, the WNPM 17 is used as the four divided buffer segments $BS_0$ to $BS_3$. However, the number of the buffer segments is not limited to four, but the WNPM 17 can be divided into a plurality of buffer segments. The number of divisions may be changed in accordance with a character size. If a character having a very large size is to be processed, the number of divisions may be 2. In this case, one character pattern should not cross across the two buffer segments. In the above embodiment, the access control circuit 22 for accessing the WNPM 17 is independently arranged. However, the Y and X address generating circuits 23 and 24 in the circuit 22 may be arranged in the WNG 14, and the Y and X address generating circuits 25 and 26 may be arranged in the filling processing section 18.

It is relatively easy to increase the width of the WNPM 17 to be larger than the number of dots corresponding to the width of the page. With this arrangement, the right and left ends of the line can be set to be word boundaries. In this case, BITBLT transfer need not be performed, but only so-called DMA transfer can be performed. That is, since DAM transfer can perform only one-dimensional addressing, a DMA controller may be reset by the controller or special-purpose hardware every transfer (¼ of the page width) of filled EI, bytes (FIG. 12). The right and left ends of the line cannot be set to be word boundaries, DMA transfer is performed in place of BITBLT transfer by software without greatly degrading the performance.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. An apparatus for generating a high quality character pattern defined by edge lines, comprising:

code pattern memory means having a plurality of areas, each of said plurality of areas storing winding number (WN) code data of a plurality of characters;

projecting means, responsive to an input projection start command, for projecting edge lines defining a pattern into said code pattern memory means in groups of N (N is a positive integer of 2 or more) points continuous in a line direction perpendicular to a filling direction, wherein the sizes of the edge lines are changed, and for concurrently updating the WN codes of points of the plurality of characters stored in said plurality of areas of said code pattern memory means according to a WN code determined at each point, and for generating a projection completion response signal when projection of the size-changed edge lines is completed;

filling means, responsive to a filling command, for filling an area defined by the size-changed edge lines to generate a dot pattern in accordance with WN codes read out from said code pattern memory means; and control means for outputting the input projection start command to said projecting means in response to an input pattern generation instruction and for outputting the filling start command to said filling means in response to the projection completion response signal generated by said projecting means.

2. An apparatus according to claim 1, further comprising:

bit map memory means for storing the dot pattern generated by said filing means; and means for transferring the dot pattern generated by said filling means to said bit map memory means in groups of N dots (N is a positive integer of 2 or more).

3. An apparatus according to claim 1, further comprising means for simultaneously generating a write address for writing the WN code data in one of said plurality of areas of aid code pattern memory means and a read address for reading out the WN code data from one of said plurality of areas of said code pattern memory means and for supplying WN code read out from one of said plurality of areas to said filing means, and for supplying the write and read addresses to said code pattern memory means.

4. An apparatus for generating a high-quality character pattern defined by edges lines, comprising;

generating means for generating segment line data defining segments constituting the edge lines;

code generating means for receiving the segment line data and for determining a change in status of a winding number of each intersection or lattice point, said each intersection being defined as an intersection between a coordinate lattice line and each segment, and said each lattice point being defined as a lattice point approximate to the intersection, and for performing a code generation operation for generating a winding number code representing a change in state or a change in value of the winding number and having one of a a first value representing no change in the state of the winding number of each intersection or lattice point, a second value representing one increment of the winding number of each intersection or lattice point, a third value representing one decrement of the winding number of each intersection or lattice point, and a fourth value representing simultaneous occurrence of increment and decrement;

first memory means having a memory region for storing second winding number codes corresponding to a plurality of characters and representing the winding number change in value or change in state of the winding number of the respective points of the character pattern, said memory region having a plurality of areas including start and end areas, said areas being addressed according to a predetermined logical sequence;

first designating means for designating one of the areas in said first memory means in which there is an origin of a character segment of the character pattern defined by the segment line data received by said code generating means;

second designating means for designating a position in the area designated by said first designating means;

third designating means for designating an area of said first memory means corresponding to the lattice point approximate to the position designated by said first and second designating means, the area of said first memory means corresponding to the lattice point that corresponds to the first winding number code generated by said code generating means, a position in the area which corresponds to the character segment origin, and a position of the lattice point in the character segment, said third designating means being operative when the area of said first memory means corresponding to the lattice point is different from the area to which the character segment origin corresponds;

updating means for updating the second winding number code at a position in the area which is designated by said third designating means on the basis of the first winding number code generated by said code generating means;

filling means, responsive to change of the area designated by said first designating means, for sequentially reading out the second winding number codes of the lattice points stored in said area of said first memory means in groups of N (N is a positive integer of 2 or more) continuous points upon completion of updating by said updating means, for generating correspondence N-lattice point winding numbers on the basis of the N-point second winding number codes, and for performing filling; and second memory means for storing the N-lattice point winding numbers generated by said filing means, the N-lattice point winding numbers being referred to in a subsequent filling processing performed by said filling means.

5. A method of generating a high-quality character pattern defined by edge lines, comprising the computer steps of:

(A) dividing a winding-number-code-pattern memory into a plurality of areas;

(B) storing winding number (WN) codes for a plurality of characters in one of the plurality of divided areas;

(C) storing winding number (WN) codes for characters in another one of the plurality of divided area after step (B) is completed;

(D) reading out the WN codes from the one area, and filling an area of a character pattern defined by the edge lines, wherein the sizes of the edge lines are changed; and (E) substantially simultaneously performing the steps (C) and (D).

6. A method according to claim 5, further comprising the step of transferring the character pattern filled by the step (D) to a bit map memory in groups of N dots (N is a positive integer of 2 or more.

* * * * *